US012735349B2

(12) United States Patent
Selwa et al.

(10) Patent No.: US 12,735,349 B2
(45) Date of Patent: Sep. 15, 2026

(54) USE OF COPPER-BASED COATINGS FOR CROPS UNDER GLASS COVERS, ANTIPHYTOPATHOGENIC COATING GLASS AND THE METHOD OF OBTAINING ANTIPHYTOPATHOGENIC COATINGS

(71) Applicant: D.A.GLASS spolka z ograniczona odpowiedzialnoscia, Glogow Malopolski (PL)

(72) Inventors: Piotr Selwa, Rzeszow (PL); Przemyslaw Przemyslaw Zabek, Trzebownisko (PL)

(73) Assignee: D.A.GLASS spolka z ograniczona odpowiedzialnoscia, Głogow Malopolski (PL)

( * ) Notice: Subject to any disclaimer, the term of this patent is extended or adjusted under 35 U.S.C. 154(b) by 154 days.

(21) Appl. No.: 18/463,598

(22) Filed: Sep. 8, 2023

(65) Prior Publication Data

US 2025/0083996 A1 Mar. 13, 2025

(30) Foreign Application Priority Data

Sep. 7, 2023 (PL) ........................................ 446040

(51) Int. Cl.
*B32B 15/04* (2006.01)
*B32B 17/06* (2006.01)
*C03C 17/23* (2006.01)

(52) U.S. Cl.
CPC .......... *C03C 17/23* (2013.01); *C03C 2204/02* (2013.01); *C03C 2217/211* (2013.01); *C03C 2217/212* (2013.01); *C03C 2217/216* (2013.01); *C03C 2217/253* (2013.01)

(58) Field of Classification Search
CPC .................................................. C03C 2204/02
USPC ........................................ 428/426, 432, 701
See application file for complete search history.

(56) References Cited

U.S. PATENT DOCUMENTS 1,890,094 A * 12/1932 Peacock, Jr. .............. B44F 1/04 428/432
2,564,708 A * 8/1951 Mochel ................... C03C 17/25 359/359
7,455,851 B1 * 11/2008 Nelson ................... A01N 43/40 424/641
11,253,842 B1 * 2/2022 Hodrinsky ........... B01J 37/0201
2013/0022835 A1 * 1/2013 Chang ..................... C23C 14/35 204/192.15
2020/0120937 A1 * 4/2020 Santra .................... A01N 59/06
2022/0009806 A1 * 1/2022 Peyton ..................... C09D 5/14
2024/0049720 A1 * 2/2024 Valdés Caballero .. A01N 43/16
2025/0194591 A1 * 6/2025 Pillot ..................... A01N 25/30

FOREIGN PATENT DOCUMENTS

EP 4238418 * 9/2023
PL 167391 8/1995
PL 187951 11/2004
PL 223800 11/2016
WO WO2022175654 * 8/2022

* cited by examiner

*Primary Examiner* — Lauren R Colgan
(74) *Attorney, Agent, or Firm* — Defillo & Associates, Inc.; Evelyn A. Defillo

(57) ABSTRACT

A copper-based coatings that contain an additional element selected from titanium, zinc, and tin for cultivation under glass covers. In addition, an antiphytopathogenic coating glass for use as glass covers mainly in greenhouses for crops cultivation, as well as a method for producing coatings on a glass surface.

13 Claims, No Drawings

USE OF COPPER-BASED COATINGS FOR CROPS UNDER GLASS COVERS, ANTIPHYTOPATHOGENIC COATING GLASS AND THE METHOD OF OBTAINING ANTIPHYTOPATHOGENIC COATINGS

FIELD OF THE INVENTION

The subject of the invention is a new application of copper-based coatings that contain an additional element selected from titanium, zinc and tin for cultivation under glass covers. The subject of the invention is also an antiphytopathogenic coating glass for use as glass covers mainly in greenhouses for crops cultivation, as well as a method for producing coatings on a glass surface.

BACKGROUND OF THE INVENTION

The Polish patent P.443993 describes a method of obtaining virucidal coatings on the surfaces of glass panes using a magnetron sputtering technique. The glass panes are placed on the rollers of the initial feeder, afterward they are transported to the initial vacuum chamber, wherein the initial vacuum is generated. Thereafter they are transported to the process vacuum chamber. The process is characterized by the fact that in the initial vacuum chamber a preliminary vacuum of $10^{-1}$ Pa is created, and in the process vacuum chamber, a process vacuum reaches values of $1.0\text{-}3.8\cdot10^{-2}$ do $3.3\cdot10^{-1}$ $9.4\cdot10^{-2}$ Pa. Nextly, the reactive gas of 600-800 $cm^3$/min is dosed and the impulse DC power supply is switched on. The process runs with the electric current intensity of 30-45 A, effective power 3.8-4.5 kW and circulating power 2.9-3.4 kW in the magnetic field generated in the chamber. The moving speed is set to 1.9-9.2 m/min and the glass sheet is transported through the first magnetron of the process chamber with the glowing plasma using at least a two-component target, one of which is copper. As a result, a transparent coating layer with a thickness of 50-185 nm is produced.

The Polish patent PL 167391 describes a method of layers deposition, wherein in the vacuum chamber of the magnetron device, a cathode, an ion source and the substrate on which the layer is applied, are placed. In a vacuum chamber, an evaporation takes place thanks to high vacuum generation. Thereafter, an ion beam arising from the source, directly hits the cathode surface of magnetron sputtering device. Finally, a high voltage is applied to the assembly of this magnetron device and a magnetron discharge is initiated.

The Polish patent PL187951 describes a glass coating method consisting in the successive application of an internal anti-reflection layer contaminating the titanium oxide layer, at least one silver layer and an external anti-reflection layer. A titanium oxide layer is deposited by cathodic magnetron sputtering, using an alternating voltage with a frequency of 5-100 kHz in an atmosphere containing argon, oxygen and nitrogen until it reaches a thickness of 15-50 nm. Then a zinc oxide layer is directly applied to this layer also by cathodic magnetron sputtering, until it reaches a thickness of 2-18 nm, followed be silver layer deposition directly on zinc oxide layer.

The Polish patent PL223800 describes a coating method by means of vacuum magnetron sputtering using a tubular magnetron. In this method the cathode of the sputtered material works in a vacuum of 0.1 to 10 Pa in the magnetic field of 2000 to 0.02 kA. At the same time a voltage of 250 to 2500 V is applied between the cathode and the sputtered substrate, while the source of the magnetic field is divided into segments spaced from 1.0 mm to 100 mm being cooled. Then, the the magnetic field source is subjected to a reciprocating movement with a speed of 0.01 to 10 cm/sec and a pitch not less than the distance between the adjacent magnetic parts of magnetic field source, and preferably in a rotary movement with respect to its longitudinal axis with a speed of 0.1 to 10 rpm.

SUMMARY OF THE INVENTION

The aim of the invention is a new use and application of two-component coatings based on copper and titanium, zinc or tin for the elimination of phytopathogens, especially these ones present in glass greenhouses as *Pseudomonas syringae* pv. tomato (IOR2146) causing bacterial speck and five fungal strains: *Alternaria solani* (IOR2046) causing early blight, *Botrytis cinerea* (IOR2235) causing gray mold, *Aspergillus fumigatus* (KKP683), *Fusarium oxysporum* (IOR2129), *Cladosporium fulvum* (IOR824) and a strongly phytopathogenic strain causing the late blight—*Phytophthora infestans* (IOR2276) belonging to the kingdom Chromista, the class Peronosporea.

A further goal of this invention is to develop antiphytopathogenic glass with coatings and a method of applying these coatings on the glass surface.

DETAILED DESCRIPTION OF THE INVENTION

The essence of this invention is the new use of copper-based coatings for crops under glass covers, which additionally contain one element selected from titanium, zinc or tin, and which are completed by oxygen from the obtained oxides, as antiphytopathogenic coatings used to eliminate phytopathogens such as: *Pseudomonas syringae* pv. tomato (IOR2146) and five fungal strains: *Alternaria solani* (IOR2046), *Botrytis cinerea* (IOR2235), *Aspergillus fumigatus* (KKP683), *Fusarium oxysporum* (IOR2129), *Cladosporium fulvum* (IOR824) *Phytophthora infestans* (IOR2276) belonging to the Chromista kingdom, the class Peronosporea.

The further essence of the invention lies in the fact that the antiphytopathogenic coating glass, which is a glass pane with a coating sputtered on it, containing copper and one additional element in accordance with the selected target, characterized in that it contains two elements, the first of which is copper in the amount of 10-90% and one of:

titanium in the amount of 0.5-15% zinc in the amount of 3-28% tin in the amount of 1-20%

The chemical coating content is completed by an oxygen arising from obtained in the process oxides. It is advantageous when the coating can be applied to raw glass, i.e. not chemically treated and diffused glass, i.e. chemically treated glass, and when the coatings have an antiphytopathogenic effect of 1 to 8 decimal logarithms against phytopathogens in the form of bacteria such as *Pseudomonas syringae*, fungi like *Alternaria solani, Cladosporium fulvum, Botrytis cinerea, Fusarium oxysporum, Phytophthora infestans*. It is also advantageous when the average direct light transmittance measured in the Vis range of 400 to 700 nm (according to the NEN 2675:2018 Greenhouse glass—Determination of optical properties of greenhouse covering materials and screens) is reduced by a maximum of 1.0% compared to the base glass, and the average hemispheric transmittance measured (according to NEN 2675:2018 Greenhouse glass—

Determination of optical properties of greenhouse covering materials and screens) is reduced by a maximum of 1.0% compared to base glass and when the sputtered coatings show high durability confirmed by abrasion tests on the Taber Surface Analyzer (model 5155) device, and the coatings are resistant to corrosion in the form of salt mist according to ISO 9227 under the following conditions 25° C., 36 h in NaCl fog (pH=7).

In turn, the essence of the method of obtaining antiphytopathogenic coatings is this, that during a process in the initial vacuum chamber a preliminary vacuum of $1.0 \cdot 10^{-1}$ Pa is created, and in the process vacuum chamber a process vacuum reaches values of $1.1 \cdot 10^{-1}$ to $7.6 \cdot 10^{-2}$ Pa. Nextly, the reactive gas of 100-900 $cm^3$/min is dosed and the impulse DC power supply is switched on. The process runs with the electric current intensity of 30-45 A, effective power 4.5-8.7 kW and circulating power 1.1-4.5 kW in the magnetic field generated in the chamber. The moving speed is set from 1.9 to 5.0 m/min and the glass sheet is transported through the first magnetron of the process chamber with the glowing plasma using at least a two-component target, one of which is copper. As a result a transparent coating layer with a thickness of $10^{-60}$ nm is produced. It is preferred that the copper target is one of: Cu90Zn10, Cu80Ti20, Cu90Sn10, and the coating is made after passing the magnetron once or twice and when the coating is obtained at low reactive gas contents between 100 and 300 $cm^3$. It is also advantageous when the coating is obtained on glass of various thicknesses between 3 and 18 mm, and also when the coating is obtained on non-tempered and thermally tempered as well as semi-tempered glass.

Example 1

The glass pane of 4 mm thickness was placed on the rollers of the initial feeder, afterward it was transported to the initial vacuum chamber, wherein the initial vacuum of $10^{-1}$ Pa was generated. Thereafter it was transported to the process (working) chamber and a process vacuum of $1.5 \cdot 10^{-1}$-$7.6 \cdot 10^{-2}$ Pa was created. Nextly, the reactive gas—oxygen of 100 $cm^3$/min was dosed and the impulse DC power supply was switched on. The process ran with the electric current intensity of 30 A, effective power 8.1 kW and circulating power 1.25 kW in the magnetic field generated in the chamber. The moving speed was set to 1.9 m/min and the glass sheet was transported through the first magnetron of the process chamber with the glowing plasma using Cu80Ti20 target. As a result a transparent coating layer with a thickness of 10 nm consisting of 0.5% titanium and 10% copper was obtained.

Example 2

The glass pane of 4 mm thickness was placed on the rollers of the initial feeder, afterward it was transported to the initial vacuum chamber, wherein the initial vacuum of $10^{-1}$ Pa was generated. Thereafter, it was transported to the process (working) chamber and a process vacuum of 2.5-$3.5 \cdot 10^{-2}$ Pa was created. Nextly, the reactive gas—oxygen of 300 $cm^3$/min was dosed and the impulse DC power supply was switched on. The process ran with the electric current intensity of 30 A, effective power 7.3 kW and circulating power 3.8 kW in the magnetic field generated in the chamber. The moving speed was set to 1.9 m/min and the glass sheet was transported through the first magnetron of the process chamber with the glowing plasma using Cu80Ti20 target. As a result a transparent coating layer with a thickness of 13 nm consisting of 12% titanium and 55% copper was obtained.

Example 3

The glass pane of 4 mm thickness was placed on the rollers of the initial feeder, afterward it was transported to the initial vacuum chamber, wherein the initial vacuum of $10^{-1}$ Pa was generated. Thereafter it was transported to the process (working) chamber and a process vacuum of 3.0-$6.9 \cdot 10^{-2}$ Pa was created. Nextly, the reactive gas—oxygen of 700 $cm^3$/min was dosed and the impulse DC power supply was switched on. The process ran with the electric current intensity of 30 A, effective power 4.5 kW and circulating power 3.1 kW in the magnetic field generated in the chamber. The moving speed was set to 1.9 m/min and the glass sheet was transported through the first magnetron of the process chamber with the glowing plasma using Cu80Ti20 target. As a result a transparent coating layer with a thickness of 17 nm consisting of 15% titanium and 78% copper was obtained.

Example 4

The glass pane of 4 mm thickness was placed on the rollers of the initial feeder, afterward it was transported to the initial vacuum chamber, wherein the initial vacuum of $10^{-1}$ Pa was generated. Thereafter it was transported to the process (working) chamber and a process vacuum of $1.2 \cdot 10^{-1}$-$7.2 \cdot 10^{-2}$ Pa Pa was created. Nextly, the reactive gas—oxygen of 100 $cm^3$/min was dosed and the impulse DC power supply was switched on. The process ran with the electric current intensity of 30 A, effective power 4.5 kW and circulating power 3.1 kW in the magnetic field generated in the chamber. The moving speed was set to 5 m/min and the glass sheet was transported through the first magnetron of the process chamber with the glowing plasma using Cu90Zn10 target. As a result a transparent coating layer with a thickness of 12 nm consisting of 3% zinc and 50% copper was obtained.

Example 5

The glass pane of 4 mm thickness was placed on the rollers of the initial feeder, afterward it was transported to the initial vacuum chamber, wherein the initial vacuum of $10^{-1}$ Pa was generated. Thereafter it was transported to the process (working) chamber and a process vacuum of 2.3-$3.3 \cdot 10^{-2}$ Pa was created. Nextly, the reactive gas—oxygen of 300 $cm^3$/min was dosed and the impulse DC power supply was switched on. The process ran with the electric current intensity of 30 A, effective power 7.5 kW and circulating power 4.0 kW in the magnetic field generated in the chamber. The moving speed was set to 5 m/min and the glass sheet was transported through the first magnetron of the process chamber with the glowing plasma using Cu90Zn10 target. As a result a transparent coating layer with a thickness of 15 nm consisting of 17% zinc and 60% copper was obtained.

Example 6

The glass pane of 4 mm thickness was placed on the rollers of the initial feeder, afterward it was transported to the initial vacuum chamber, wherein the initial vacuum of $10^{-1}$ Pa was generated. Thereafter it was transported to the process (working) chamber and a process vacuum of 2.7-$6.6\cdot10^{-2}$ Pa was created. Nextly, the reactive gas—oxygen of 900 $cm^3$/min was dosed and the impulse DC power supply was switched on. The process ran with the electric current intensity of 30 A, effective power 4.7 kW and circulating power 3.4 kW in the magnetic field generated in the chamber. The moving speed was set to 5 m/min and the glass sheet was transported through the first magnetron of the process chamber with the glowing plasma using Cu90Zn10 target. As a result a transparent coating layer with a thickness of 20 nm consisting of 20% zinc and 62% copper was obtained.

Example 7

The glass pane of 4 mm thickness was placed on the rollers of the initial feeder, afterward it was transported to the initial vacuum chamber, wherein the initial vacuum of $10^{-1}$ Pa was generated. Thereafter it was transported to the process (working) chamber and a process vacuum of 2.7-$6.6\cdot10^{-2}$ Pa was created. Nextly, the reactive gas—oxygen of 900 $cm^3$/min was dosed and the impulse DC power supply was switched on. The process ran with the electric current intensity of 45 A, effective power 8.3 kW and circulating power 4.5 kW in the magnetic field generated in the chamber. The moving speed was set to 5 m/min and the glass sheet was transported through the first magnetron of the process chamber with the glowing plasma using Cu90Zn10 target. As a result a transparent coating layer with a thickness of 60 nm consisting of 23% zinc and 70% copper was obtained.

Example 8

The glass pane of 4 mm thickness was placed on the rollers of the initial feeder, afterward it was transported to the initial vacuum chamber, wherein the initial vacuum of $10^{-1}$ Pa was generated. Thereafter it was transported to the process (working) chamber and a process vacuum of $1.1\cdot10^{-1}$-$7.1\cdot10^{-2}$ Pa was created. Nextly, the reactive gas—oxygen of 100 $cm^3$/min was dosed and the impulse DC power supply was switched on. The process ran with the electric current intensity of 30 A, effective power 8.7 kW and circulating power 1.1 kW in the magnetic field generated in the chamber. The moving speed was set to 4 m/min and the glass sheet was transported through the first magnetron of the process chamber with the glowing plasma using Cu90Sn10 target. As a result a transparent coating layer with a thickness of 15 nm consisting of 20% tin and 70% copper was obtained.

Example 9

The glass pane of 4 mm thickness was placed on the rollers of the initial feeder, afterward it was transported to the initial vacuum chamber, wherein the initial vacuum of $10^{-1}$ Pa was generated. Thereafter it was transported to the process (working) chamber and a process vacuum of 2.2-$3.1\cdot10^{-2}$ Pa was created. Nextly, the reactive gas—oxygen of 300 $cm^3$/min was dosed and the impulse DC power supply was switched on. The process ran with the electric current intensity of 30 A, effective power 7.7 kW and circulating power 4.2 kW in the magnetic field generated in the chamber. The moving speed was set to 4 m/min and the glass sheet was transported through the first magnetron of the process chamber with the glowing plasma using Cu90Sn10 target. As a result a transparent coating layer with a thickness of 25 nm consisting of 12% tin and 80% copper was obtained.

Example 10

The glass pane of 4 mm thickness was placed on the rollers of the initial feeder, afterward it was transported to the initial vacuum chamber, wherein the initial vacuum of $10^{-1}$ Pa was generated. Thereafter it was transported to the process (working) chamber and a process vacuum of 2.6-$6.4\cdot10^{-2}$ Pa was created. Nextly, the reactive gas—oxygen of 900 $cm^3$/min was dosed and the impulse DC power supply was switched on. The process ran with the electric current intensity of 30 A, effective power 4.9 kW and circulating power 3.6 kW in the magnetic field generated in the chamber. The moving speed was set to 4 m/min and the glass sheet was transported through the first magnetron of the process chamber with the glowing plasma using Cu90Sn10 target. As a result a transparent coating layer with a thickness of 55 nm consisting of 1% tin and 90% copper was obtained.

TABLE 1 the list of process parameters described in the examples 1-10

| Number | Target | Coating thickness [nm] | Working current [A] | Moving speed [m/min] | Number of passes through process chamber | Amount of reactive gas [$cm^3$ $min^{-1}$] | Effective power [kW] | Circulating power [kW] | Process vacum [Pa] |
|---|---|---|---|---|---|---|---|---|---|
| 1 | Cu80Ti20 | 10 | 30 | 1.9 | 2 | 100 | 8.1 | 1.25 | 1.5 · 10 − 1-7.6 · 10 − 2 |
| 2 | Cu80Ti20 | 13 | 30 | 1.9 | 2 | 300 | 7.3 | 3.8 | 2.5-3.5 · 10 − 2 |
| 3 | Cu80Ti20 | 17 | 30 | 1.9 | 2 | 700 | 4.5 | 3.1 | 3.0-6.9 · 10 − 2 |
| 4 | Cu90Zn10 | 12 | 30 | 5 | 1 | 100 | 8.5 | 1.2 | 1.2 · 10 − 1-7.2 · 10 − 2 |
| 5 | Cu90Zn10 | 15 | 30 | 5 | 1 | 300 | 7.5 | 4.0 | 2.3-3.3 · 10 − 2 |
| 6 | Cu90Zn10 | 20 | 30 | 5 | 1 | 900 | 4.7 | 3.4 | 2.7-6.6 · 10 − 2 |
| 7 | Cu90Zn10 | 60 | 45 | 5 | 1 | 900 | 8.3 | 4.5 | 2.7-6.6 · 10 − 2 |
| 8 | Cu90Sn10 | 15 | 30 | 4 | 1 | 100 | 8.7 | 1.1 | 1.1 · 10 − 1-7.1 · 10 − 2 |
| 9 | Cu90Sn10 | 25 | 30 | 4 | 1 | 300 | 7.7 | 4.2 | 2.2-3.1 · 10 − 2 |
| 10 | Cu90Sn10 | 55 | 30 | 4 | 1 | 900 | 4.9 | 3.6 | 2.6-6.4 · 10 − 2 |

After the coatings were sputtered using the method according to the invention, they composed of chemical elements in accordance with the used target, however the quantity of chemical elements was described below in examples 11 to 13.

Example 11

The magnetron coating obtained according to the Examples 1-3 for the Cu80Ti2O target composed of $10^{-78}$% copper and 0.5-15% titanium. Due to the fact that metals are present in the coating in the form of oxides, the remaining elemental percentage (up to 100%) is oxygen.

Example 12

The magnetron coating obtained according to the Examples 4-7 for the Cu90Zn10 target composed of 50-70% copper and 3-28% zinc. Due to the fact that metals are present in the coating in the form of oxides, the remaining elemental percentage (up to 100%) is oxygen.

Example 13

The magnetron coating obtained according to the Examples 8-10 for the Cu90Sn10 target composed of 70-90% copper and 1-20% tin. Due to the fact that metals are present in the coating in the form of oxides, the remaining elemental percentage (up to 100%) is oxygen.

TABLE 2

The share of individual chemical components in the coating depending on the type of used target.

| | Metal percentage in the coating | |
|---|---|---|
| Type of target | Cu/% | X1/% |
| Cu80Ti20 | Cu 10-78 | Ti 0.5-15 |
| Cu90Zn10 | Cu 50-70 | Zn 3-28 |
| Cu90Sn10 | Cu 70-90 | Sn 1-20 |

The coatings described in examples 11-13 were sputtered onto the internal surfaces of experimental cubes (0.5×0.5×0.5 m) using the method described in examples 1·10, and then the survival of microorganisms (*Pseudomonas syringae* pv. tomato) and five fungal strains: *Aspergillus fumigatus, Alternaria solani, Botrytis cinerea, Fusarium oxysporum, Cladosporium fulvum* syn. *Passalora fulva*) and one representative of Chromista—Phytophtora *infestans*) introduced into the cubic experimental object made of coated glass on the inner surfaces of the glass and floating in the circulating air, was investigated.

An inactivation of microorganisms on the surface of the sputtered glass and in the circulating air was observed at the level between 3 and 8 decimal logarithms, however, for the coating obtained in example 6, the highest level of microorganism reduction was obtained at the level >6.0 and >8.0 for the imprint (using imprint plates) and swab method, respectively. The results for the fungal strains Phytophtora *infestans* and *Cladosporium fulvum* turned out to be decisive. On the wall surfaces made of glass with a coating obtained from the Cu90Zn10 cathode, a complete reduction of the above strains was obtained in the analysis performed by swabs. A similar result was obtained by the imprint method. The experimental cube used in the studies had an H13 filter blocking the access of microorganisms from the outside.

After finishing the investigations in the experimental cubes, further tests were carried out as part of the greenhouse study. The biocidal activity against following phytopathogens *Pseudomonas syringae* pv. tomato and four fungi strains (*Alternaria solani, Botrytis cinerea, Fusarium oxysporum, Cladosporium fulvum* syn. *Passalora fulva*) and one representative of Chromista—Phytophtora *infestans* at the level between 1 and 3 decimal logarithms both on internal surfaces and in the circulating inside the experimental greenhouse air was observed.

The invention claimed is:

1. A coating adapted to be use for glass covers protecting crops, the coating comprising in percent weight:

1) a copper 10-90%; and 2) one of:

a titanium in the amount of 0.5-15%, a zinc in the amount of 3-28%, a tin in the amount of 1-20%, 3) remaining balance is oxygen, wherein the coating is an ant phytopathogenic coating having the formula Cu80Ti20, Cu90Zn10, or Cu90Sn10, wherein the coating eliminates phytopathogens including: *Pseudomonas syringae* pv. tomato (IOR2146) and fungal strains including: *Alternaria solani* (IOR2046), *Botrytis cinerea* (IOR2235), *Aspergillus fumigatus* (KKP683), *Fusarium oxysporum* (IOR2129), *Cladosporium fulvum* (IOR824) *Phytophthora infestans* (IOR2276) belonging to the Chromista kingdom, the class Peronosporea.

2. A coating adapted to be use for glass covers protecting crops, the coating consisting of in percent weight:

1) a copper $10^{-90}$%; and 2) one of:

a titanium in the amount of 0.5-15%, a zinc in the amount of 3-28%, a tin in the amount of 1-20%, 3) remaining balance is oxygen, wherein the coating is an antiphytopathogenic coating having the formula Cu80Ti20, Cu90Zn10, or Cu90Sn10, wherein the coating eliminates phytopathogens including: *Pseudomonas syringae* pv. tomato (IOR2146) and fungal strains including: *Alternaria solani* (IOR2046), *Botrytis cinerea* (IOR2235), *Aspergillus fumigatus* (KKP683), *Fusarium oxysporum* (IOR2129), *Cladosporium fulvum* (IOR824) *Phytophthora infestans* (IOR2276) belonging to the Chromista kingdom, the class Peronosporea.

3. An antiphytopathogenic coating glass having a glass pane with a sputtered coating, the sputtered coating containing:

copper in the amount of 10-90% and one of:

titanium in the amount of 0.5-15%, zinc in the amount of 3-28%, tin in the amount of 1-20%, remaining balance is oxygen, wherein the sputtered coating has the formula Cu80Ti20, Cu90Zn10, or Cu90Sn10, wherein the sputtered coating eliminates phytopathogens including *Pseudomonas syringae* pv. tomato (IOR2146) and fungal strains including *Alternaria solani* (IOR2046), *Botrytis cinerea* (IOR2235), *Aspergillus fumigatus* (KKP683), *Fusarium oxysporum* (IOR2129), *Cladosporium fulvum* (IOR824) *Phytophthora infestans* (IOR2276) belonging to the Chromista kingdom, the class Peronosporea.

4. The antiphytopathogenic coating glass according to claim 3, wherein sputtered coating has an antiphytopathogenic effect of 1 to 8 decimal logarithms against phytopathogens in the form of bacteria including *Pseudomonas syringae*, fungi like *Alternaria solani, Cladosporium fulvum, Botrytis cinerea, Fusarium oxysporum*, Chromista like *Phytophthora infestans* both present on the surface of coated glass and floating in the circulating air.

5. The antiphytopathogenic coating glass according to claim 3, wherein the sputtered coating reduces an average direct light transmittance measured in the Vis range of 400 to 700 nm (according to the NEN 2675:2018 Greenhouse glass) by a maximum of 1.0% compared to the base glass.

6. The antiphytopathogenic coating glass according to claim 3, wherein the sputtered coating reduces an average hemispherical transmittance measured (according to NEN 2675:2018 Greenhouse glass) by a maximum of 1.0% compared to base glass.

7. The antiphytopathogenic coating glass according to claim 3, wherein the sputtered coating has a durability confirmed by abrasion tests.

8. The antiphytopathogenic coating glass according to claim 3, wherein the sputtered coating is resistant to corrosion in the form of salt mist according to ISO 9227 under the following conditions: 25° C., 36 h in NaCl fog (pH=7).

9. A method for obtaining the antiphytopathogenic coating of claim 1 on a glass pane surface, the method comprising the steps of:

placing the glass pane surface on rollers of an feeder;

transporting the glass pane surface to an initial vacuum chamber, wherein an initial vacuum is generated;

transporting the glass pane surface of the previous step to a process vacuum chamber;

wherein the initial vacuum chamber has a preliminary vacuum of $1.0 \cdot 10^{-1}$ Pa;

wherein the process vacuum chamber produces a process vacuum of $1.1 \cdot 10^{-1}$ to $7.6 \cdot 10^{-2}$ Pa.;

nextly, the reactive gas of 100-900 cm3/min is dosed and the impulse DC power supply is switched on;

wherein the method runs with an electrical current intensity of 30-45 A, an effective power 4.5-8.7 KW, and a circulating power 1.1-4.5 kW in the magnetic field generated in the chamber;

wherein a moving speed is set to 1.9-9.2 m/min and the glass pane surface transported through a first magnetron of the process chamber with a glowing plasma using at least a two-component target, wherein the first component is copper;

wherein the method produces a transparent coating layer with a thickness of 10-60 nm.

10. The method according to claim 9, wherein the coating is made after passing the magnetron once or twice.

11. The method according to claim 9, wherein the coating is obtained at low reactive gas contents between 100 and 300 $cm^3$.

12. The method according to claim 9, wherein the coating is obtained on glass of various thicknesses between 3 and 18 mm.

13. The method according to claim 9, wherein the coating is obtained on non-tempered and thermally tempered or semi-tempered glass.

* * * * *